United States Patent
Kusaka et al.

(10) Patent No.: US 8,274,434 B2
(45) Date of Patent: Sep. 25, 2012

(54) ELECTRONIC APPARATUS WITH A POSITIONING STRUCTURE FOR CABLE ORIENTATION

(75) Inventors: Hiroyuki Kusaka, Mitaka (JP); Toshiyuki Hirota, Hino (JP); Hiroyuki Hotta, Hamura (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 662 days.

(21) Appl. No.: 12/324,644

(22) Filed: Nov. 26, 2008

(65) Prior Publication Data

US 2009/0303137 A1 Dec. 10, 2009

(30) Foreign Application Priority Data

Jun. 5, 2008 (JP) .................... 2008-148439

(51) Int. Cl.
 *H01Q 1/24* (2006.01)
(52) U.S. Cl. ................ 343/702; 343/700 MS
(58) Field of Classification Search ........... 343/700 MS, 343/702
See application file for complete search history.

(56) References Cited

U.S. PATENT DOCUMENTS

| | | | |
|---|---|---|---|
| 5,874,920 A | 2/1999 | Araki et al. | |
| 6,285,328 B1 * | 9/2001 | Masaki et al. | 343/702 |
| 6,509,877 B2 * | 1/2003 | Masaki | 343/702 |
| 6,625,013 B2 | 9/2003 | Minaguchi et al. | |
| 6,642,892 B2 | 11/2003 | Masaki et al. | |
| 6,653,983 B2 * | 11/2003 | Masuda et al. | 343/767 |
| 6,930,644 B2 * | 8/2005 | Konishi et al. | 343/702 |
| 6,972,722 B2 | 12/2005 | Katoh et al. | |
| 7,113,149 B2 * | 9/2006 | Cornec et al. | 343/906 |
| 7,123,196 B2 * | 10/2006 | Masaki | 343/702 |
| 7,242,354 B2 * | 7/2007 | Katoh et al. | 343/702 |
| 7,564,412 B2 * | 7/2009 | Walker et al. | 343/702 |
| 7,719,473 B2 * | 5/2010 | Asano et al. | 343/702 |
| 7,733,275 B2 * | 6/2010 | Hirota | 343/702 |
| 7,733,276 B2 * | 6/2010 | Levy et al. | 343/702 |
| 7,755,548 B2 * | 7/2010 | Lev | 343/702 |
| 2003/0090429 A1 | 5/2003 | Masudaya et al. | |
| 2007/0057855 A1 * | 3/2007 | Mizoguchi et al. | 343/702 |

FOREIGN PATENT DOCUMENTS

| | | |
|---|---|---|
| JP | 9-205305 | 8/1997 |
| JP | 9-205312 | 8/1997 |
| JP | 2001-069213 | 3/2001 |
| JP | 2003-152443 | 5/2003 |
| JP | 2004-236184 | 8/2004 |
| JP | 2004-266681 | 9/2004 |

OTHER PUBLICATIONS

Japanese Patent Application No. 2008-148439, Notice of Reasons for Rejection, mailed May 19, 2009, (English translation).

* cited by examiner

*Primary Examiner* — HoangAnh Le
(74) *Attorney, Agent, or Firm* — Blakely, Sokoloff, Taylor & Zafman LLP

(57) ABSTRACT

According to one embodiment, an antenna unit provided on the inner surface of the upper peripheral portion of the display housing of a notebook PC includes a projection that positions a power feeder connected to an electronic component adjacent to the antenna unit such that the power feeder extends at a constant distance from the core member of the antenna unit. The projection projects from the core member at a position at which it does not interfere with an antenna wire, and includes a recess that receives the power feeder.

19 Claims, 8 Drawing Sheets

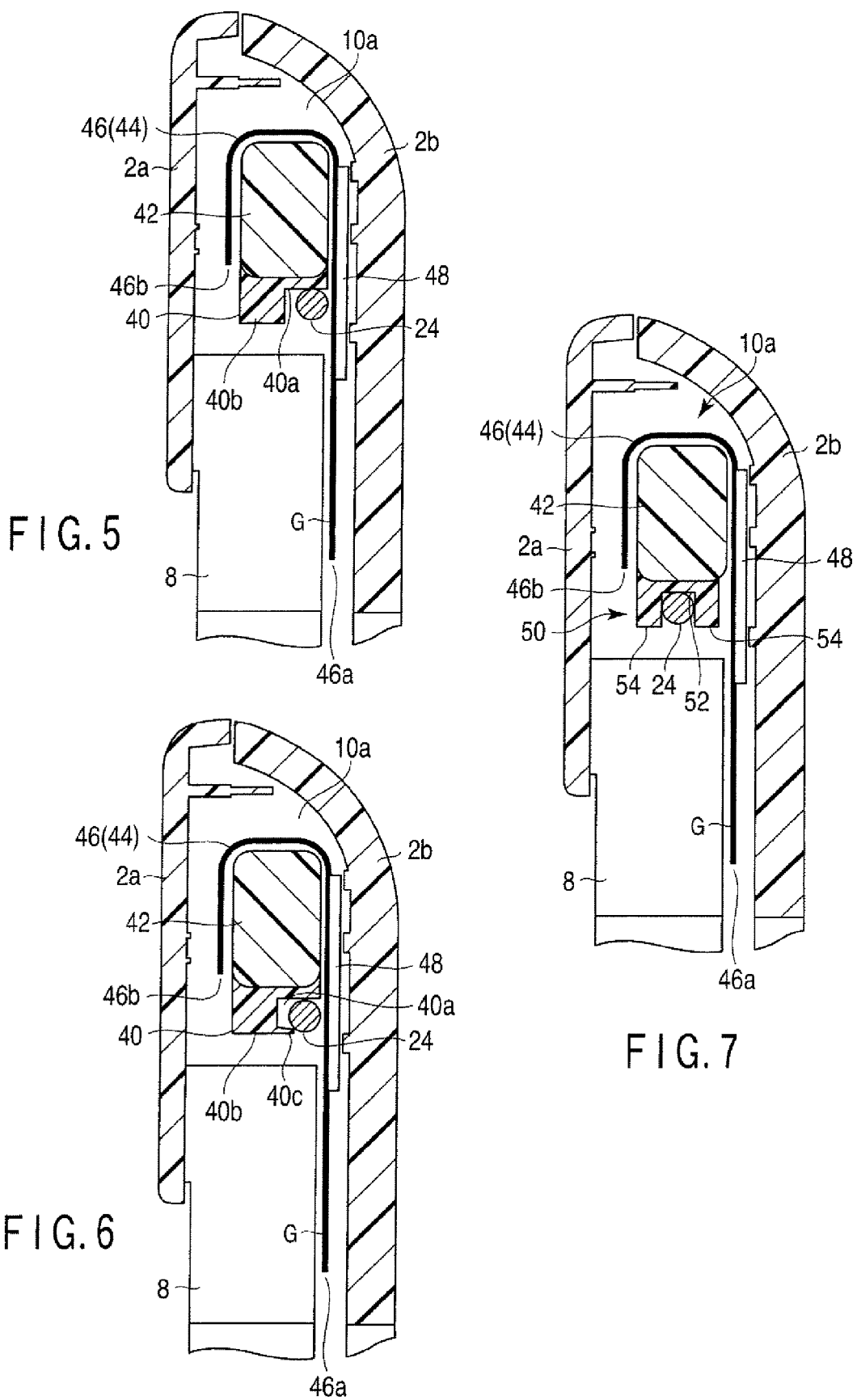

ELECTRONIC APPARATUS WITH A POSITIONING STRUCTURE FOR CABLE ORIENTATION

CROSS-REFERENCE TO RELATED APPLICATIONS

This application is based upon and claims the benefit of priority from Japanese Patent Application No. 2008-148439, filed Jun. 5, 2008, the entire contents of which are incorporated herein by reference.

BACKGROUND

1. Field

One embodiment of the invention relates to an electronic apparatus in which electronic components and antenna units are provided inside the peripheral portion of a housing.

2. Description of the Related Art

Jpn. Pat. Appln. KOKAI Publication No. 2004-266681, for example, discloses a notebook personal computer (hereinafter referred to as "the notebook PC") as an electronic apparatus in which antenna units are provided inside the peripheral portion of a housing (see paragraph [0032], and FIG. 4).

The disclosed notebook PC comprises antenna units provided on the opposite sides of the housing of a display unit. Each antenna unit has a structure in which an antenna ground section is interposed between a connection section and an electric-wave resonating section to make a power feeder, provided along an inner side surface of the housing, away from the electric-wave resonating section. This structure can prevent change of antenna characteristics due to variations in the position of the power feeder.

However, since the disclosed antenna units are each formed by pressing a single steel plate, if the power feeder is extended along the antenna ground section, it adversely affects the characteristics of the electric-wave resonating section.

BRIEF DESCRIPTION OF TEE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

FIG. 5 is a sectional view illustrating an essential part of the antenna unit shown in FIG. 4;

FIG. 6 is a sectional view illustrating a modification of the antenna unit shown in FIG. 5;

FIG. 7 is a sectional view illustrating an essential part of an antenna unit provided with a positioning structure according to a second embodiment of the invention;

Figures 8, 9, 10:
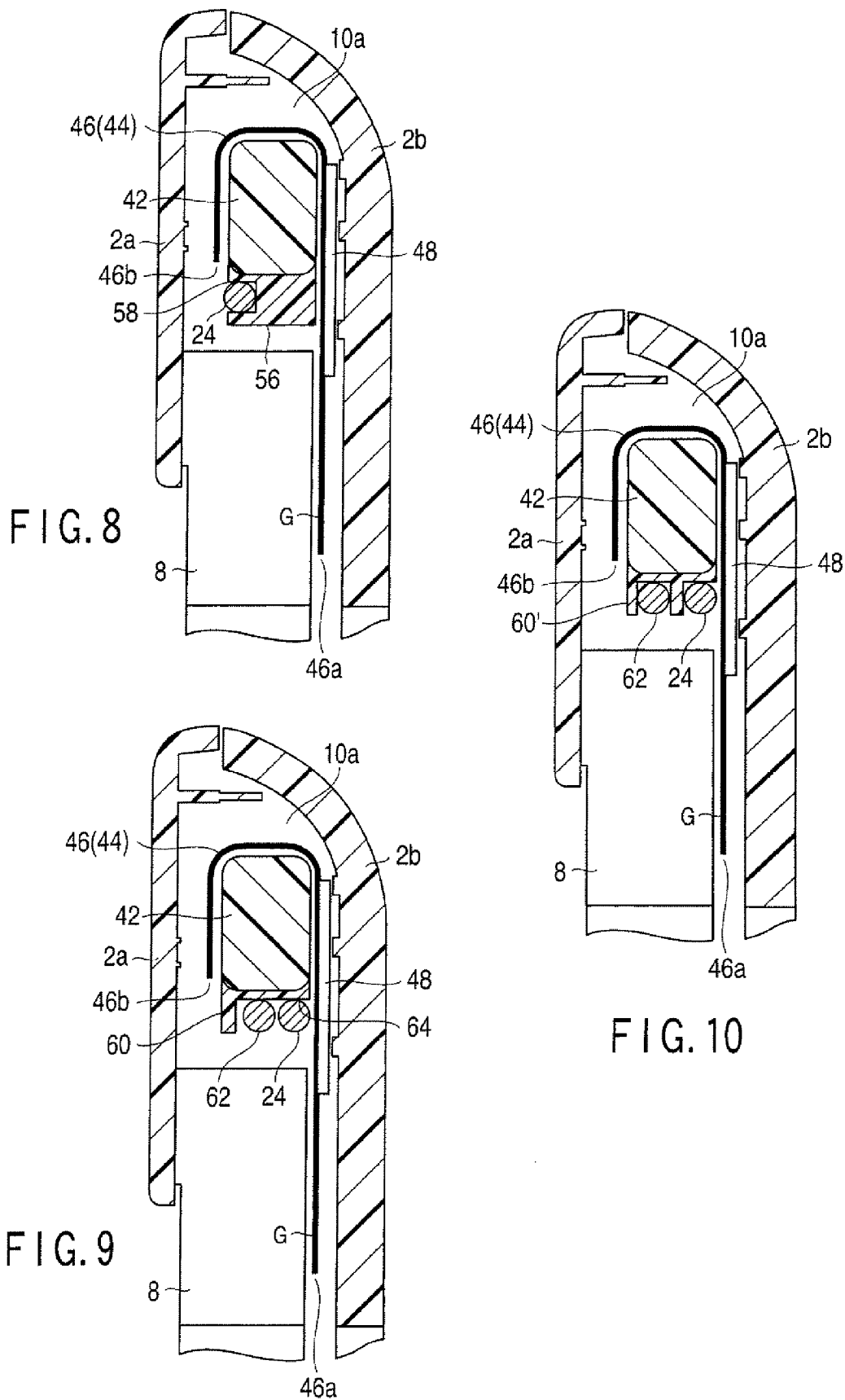
FIG. 8 is a sectional view illustrating a modification of the antenna unit shown in FIG. 7.
Figure 11:
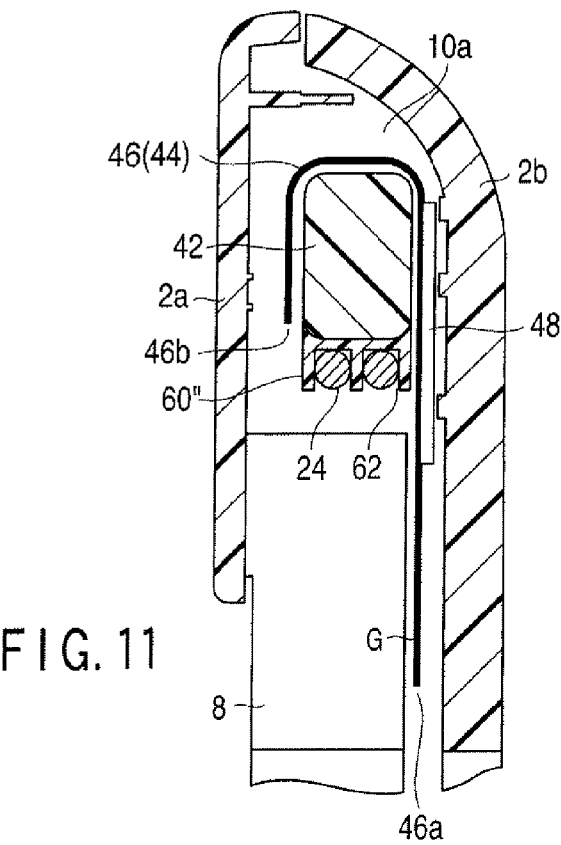
Figure 12:
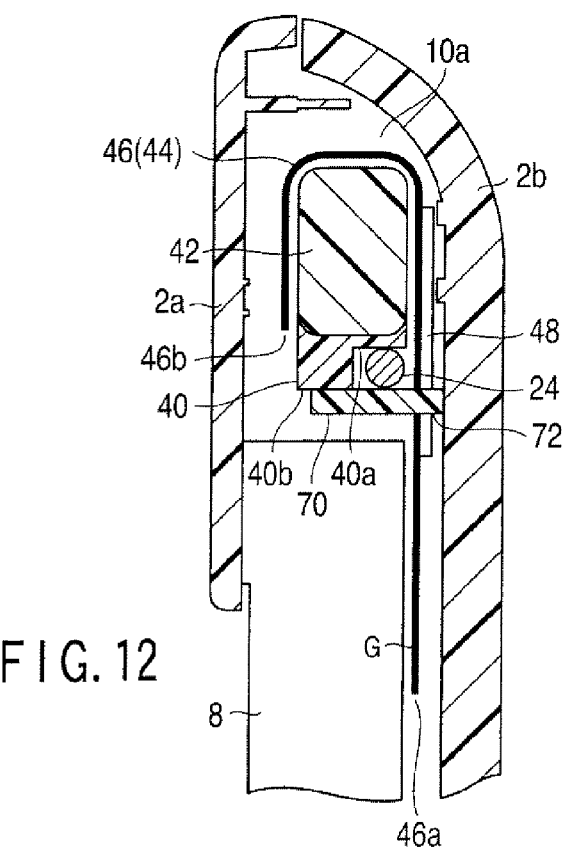
Figure 13:
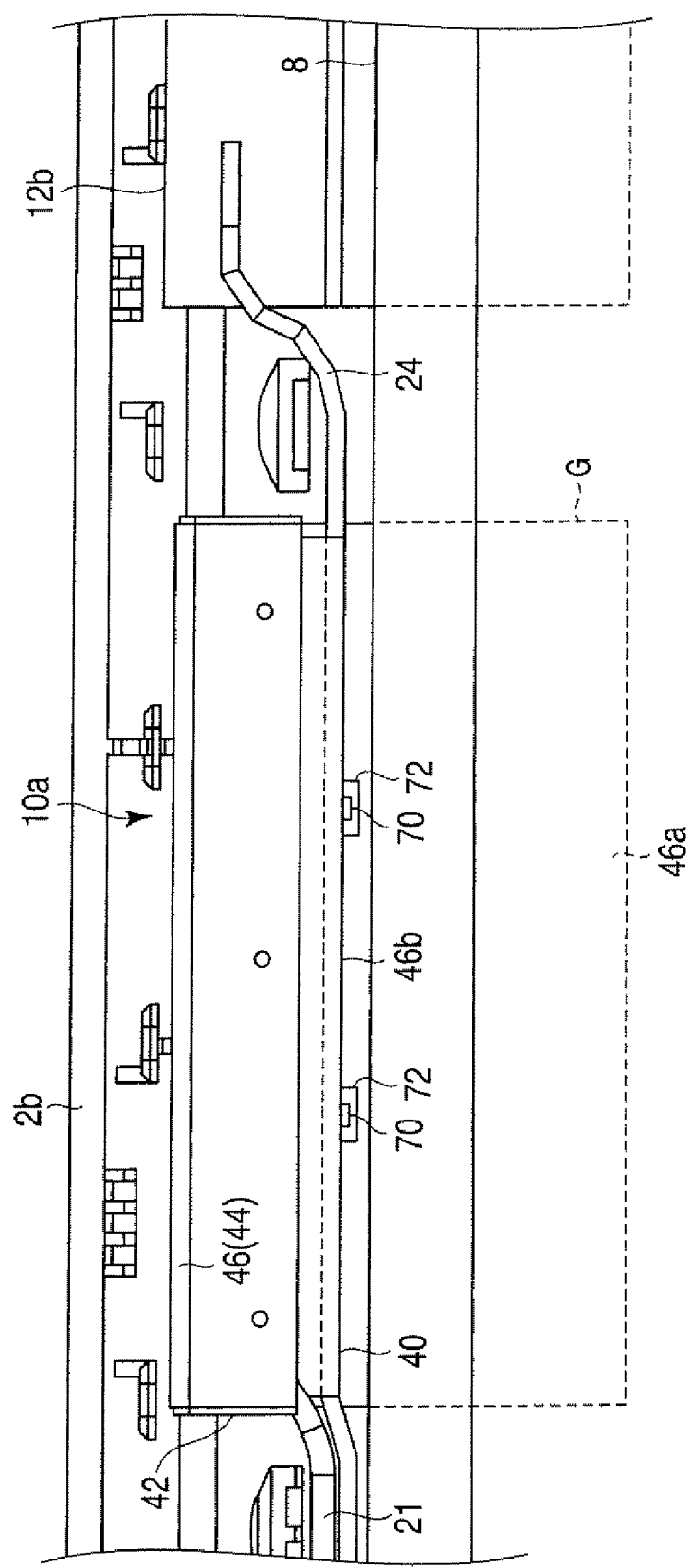

FIG. 9 a sectional view illustrating an essential part of an antenna unit provided with a positioning structure according to a third embodiment of the invention;

FIG. 10 is a sectional view illustrating a first modification of the antenna unit shown in FIG. 9;

FIG. 11 is a sectional view illustrating a second modification of the antenna unit shown in FIG. 9;

FIG. 12 is a sectional view illustrating an essential part of an antenna unit provided with a positioning structure according to a fourth embodiment of the invention;

FIG. 13 is a front view illustrating the antenna unit shown in FIG. 12; and

Figure 14:
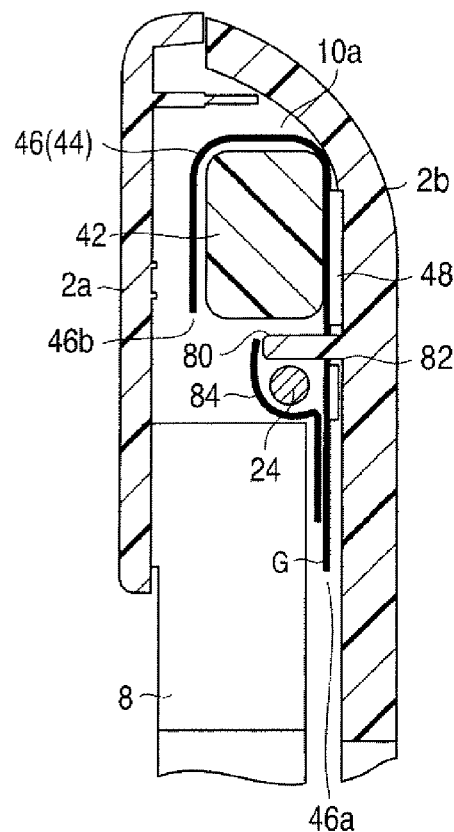

FIG. 14 is a sectional view illustrating an essential part of an antenna unit provided with a positioning structure according to a fifth embodiment of the invention.

DETAILED DESCRIPTION

Figure 2:
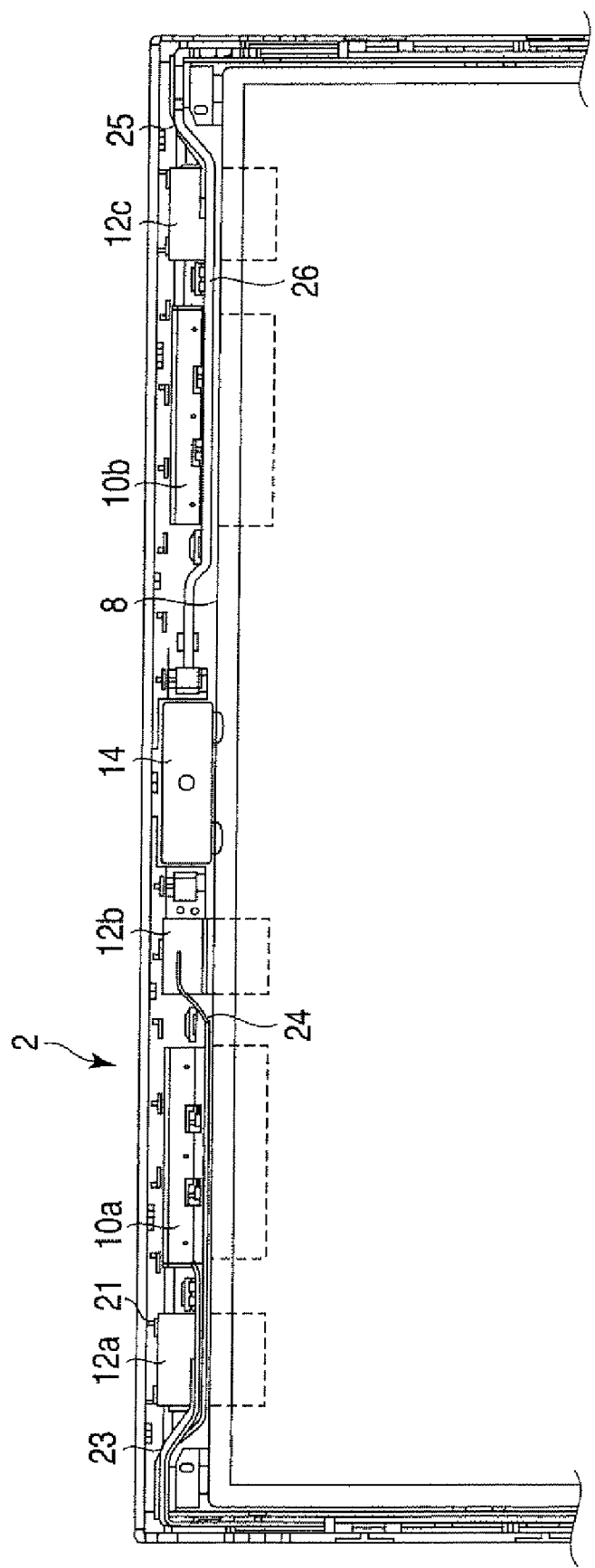
FIG. 2 is a view illustrating the inner structure of the upper peripheral portion of a housing incorporated in the notebook PC of FIG. 1.
Figure 4:
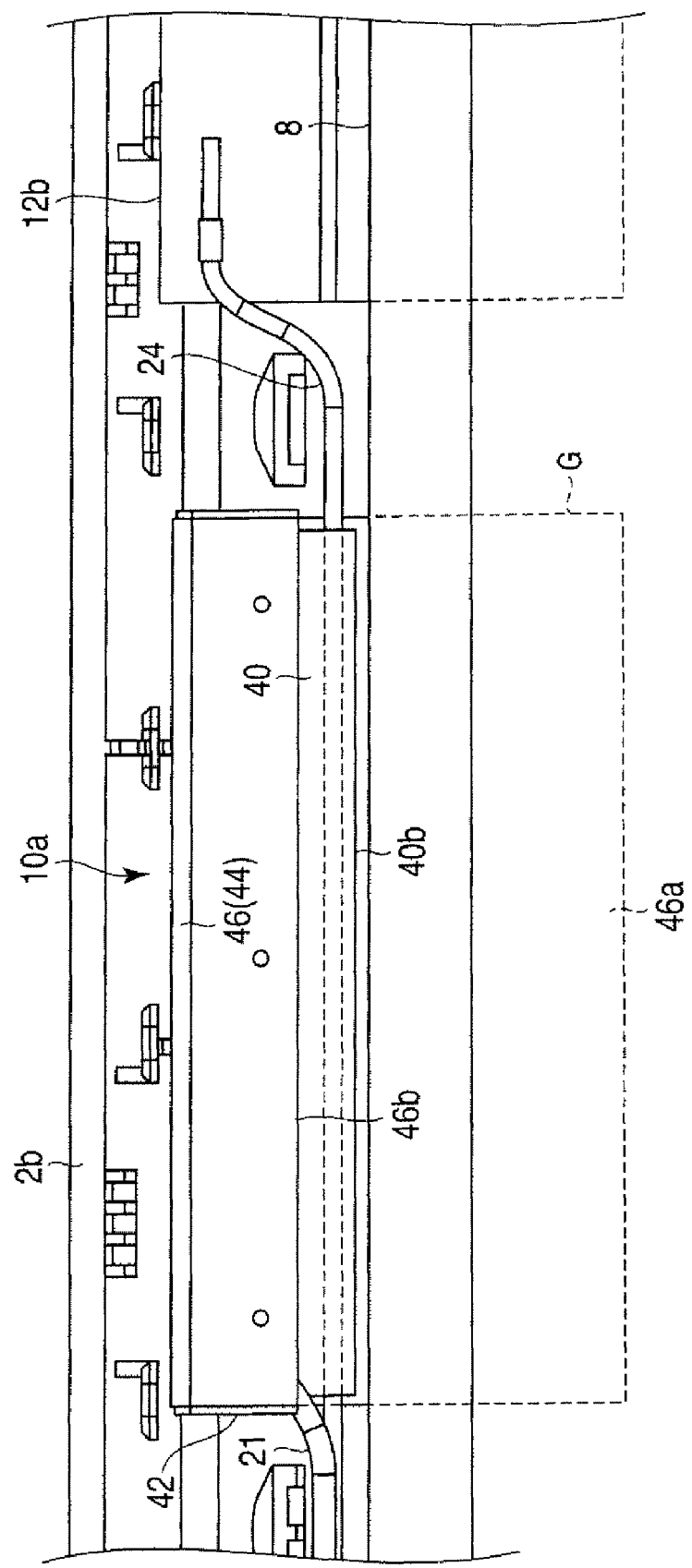
FIG. 4 is a front view illustrating an antenna unit provided with a positioning structure according to a first embodiment of the invention.

Various embodiments according to the invention will be described hereinafter with reference to the accompanying drawings. In general, according to one embodiment of the Invention, an antenna unit 10a is attached to the upper peripheral portion of a display housing 2 incorporated in a notebook PC 1, and the power feeder 24 of another electronic component 12b is provided in the housing inside the antenna unit 10a and adjacent thereto, as is shown in FIG. 2. To provide the power feeder 24 separate from the antenna unit 10a, a projection 40 projecting from a core member 24 is incorporated in the antenna unit 10a as shown in FIG. 4.

Figure 1:
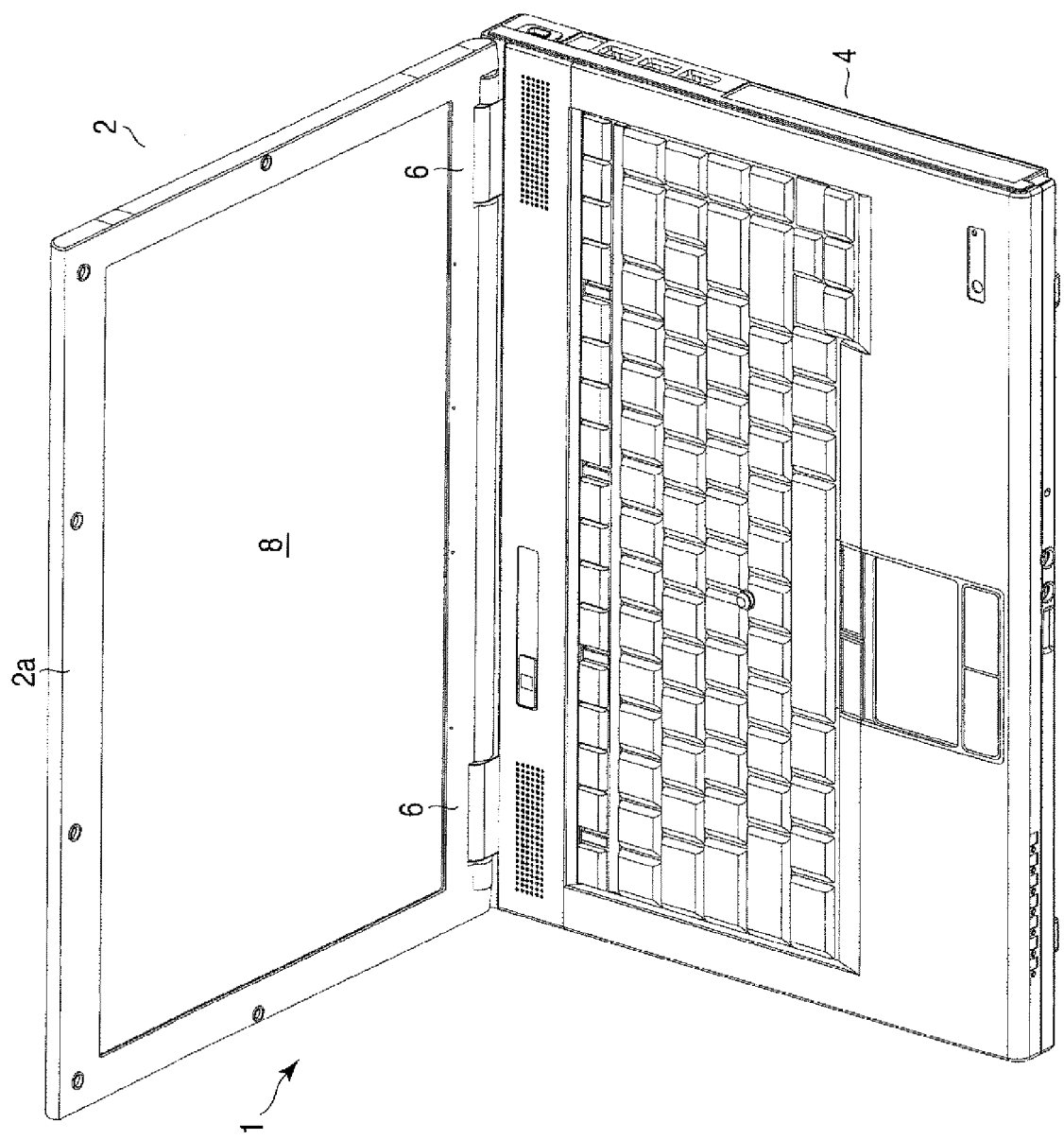
FIG. 1 is a perspective view of a notebook PC according to the invention.

FIG. 1 is a perspective view illustrating a notebook personal computer I (hereinafter, the notebook PC 1) as an electronic device according to the invention. FIG. 2 is a view illustrating the inner structure of the upper peripheral portion of a display housing 2 incorporated in the notebook PC 1. The electronic device according to the invention is not limited to the notebook PC 1, but may be another electronic device that has a display unit formed integral with a main unit and has a wireless communication function.

As shown in FIG. 1 the notebook PC 1 mainly has an almost rectangular flat display housing 2 and an almost rectangular flat main unit 4. The lower end of the display housing 2 is rotatably coupled to the main body 4 via two hinges 6. The display housing 2 is operable and closeable between a closed position in which the housing 2 closes the upper surface of the main unit 4, and an open position, as shown in FIG. 1, in which the upper surface of the main unit 4 is exposed. In the case of a tablet-type notebook PC, the display housing 2 and the main body 4 are coupled by a single hinge.

As shown in FIG. 2, the display housing 2 contains a rectangular liquid crystal panel 8, five antenna units 10a, 10b, 12a, 12b and 12c for wireless communication, and a camera 14. The five antenna units 10a, 10b, 12a, 12b and 12c and the camera 14 are arranged in line outside the upper end of the liquid crystal panel 8, i.e., along the upper peripheral portion of the housing. The five antenna units 10a, 10b, 12a, 12b and 12c and the camera 14 are covered with a rectangular frame-like mask member 2a as shown in FIG. 1.

The two antenna units 10a and 10b are 3G antennas, and the other three antenna units 12a, 12b and 12c include, for example, a wireless LAN antenna unit, such as Bluetooth (trademark). The five antenna units 10a, 10b, 12a, 12b and 12c and the camera 14 are arranged along the upper end of the liquid crystal panel 8, in the order shown in FIG. 2.

Figure 3:
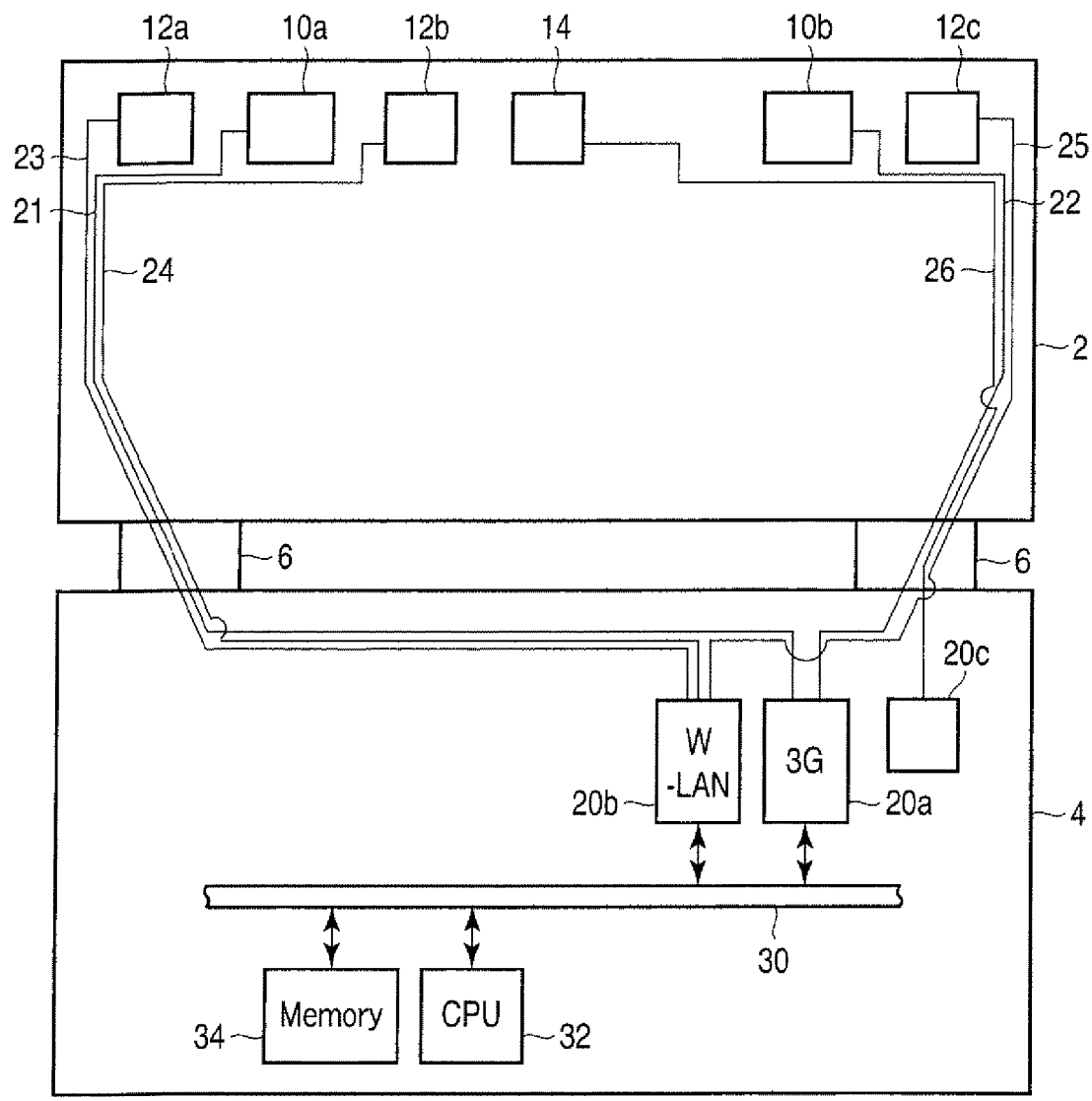
FIG. 3 is a schematic view useful in explaining the wiring structure of electronic components provided in the upper peripheral portion of the PC shown in FIG. 2.

FIG. 3 is a schematic view illustrating the wiring structure of the five antenna units 10a, 10b, 12a, 12b and 12c and the camera 14. The main unit 4 contains a wireless communication module 20a for 3G connected to the antenna units 10a and 10b, and wireless communication module 20b for wireless LAN connected to the antenna units 12a, 12b and 12c. The wireless communication modules 20a and 20b serve as power feeder circuits for generating high-frequency signals corresponding to transmission signals to be transmitted.

More specifically, the wireless communication module 20a is connected to the antenna units 10a and 10b via power feeders 21 and 22, respectively, which pass through the hinges 6. Similarly, the wireless communication module 20b is connected to the antenna units 12a, 12b and 12c via power feeders 23, 24 and 25, respectively, which pass through the hinges 6. The power feeders 21 to 25 are formed of, for example, coaxial cables with a diameter of approx. 1 mm. Further, a cable 26 connected to the camera 14 is also connected to the main unit 4 via one of the hinges 6.

The wireless communication modules 20a and 20b are connected to a CPU 32 and a memory 34 via a CPU bus 30, and each include a radio frequency (RF) section, a quartz oscillation section and a baseband processing section, which are not shown.

FIG. 4 is a front view of the antenna unit 10a according to a first embodiment of the invention. FIG. 5 is a sectional view taken along line V-V of FIG. 4. Note that FIG. 4 does not show the mask member 2a that covers the peripheral portion of the liquid crystal panel 8, whereas FIG. 5 shows the mask member 2a. The antenna unit 10a is located closer to a corner of the display housing 2 than the antenna unit 12b as another electronic component.

As shown in FIG. 4, the power feeder 24 (cable) of the antenna unit 12b (electronic component) located inside the upper peripheral portion of the display housing 2 at the right-hand side of the antenna unit 10a is extended to the left-side near the antenna unit 10a. In this structure, if the power feeder 24 vertically moves to vary the distance between the power feeder 24 and the antenna unit 10a, it influences the characteristics of the antenna unit 10a. In other words, to stabilize the characteristics of the antenna unit 10a, it is important to keep, constant, the distance between the power feeder 24 and the antenna unit 10a.

The same can be said of the cable 26 for the camera 14 (electronic component), which passes near the antenna unit 10b. Namely, to stabilize the characteristics of the antenna unit 10a, it is important to keep, constant, the distance between the cable 26 and the antenna unit 10b. A description will now be given of a structure for positioning the power feeder 24 to extend it near the antenna unit 10a with a sufficient distance defined therebetween.

Note that where a plurality of antenna units and electronic components, such as a camera, are arranged alone the upper peripheral portion of the display unit 2, as in the above-described notebook PC 1, the cables connecting the electronic components to the main unit 4 are inevitably extended near the electronic components. Although in the embodiment, only the power feeder 24 of the antenna unit 12b is extended near the antenna unit 10a, a plurality of cables may be extended near the antenna unit 10a, depending upon the way of routing the cables.

Therefore, the inventors of the present invention have developed a positioning structure for the power feeder 24, which does not adversely affect the characteristics of the antenna unit 10a. Namely, the antenna unit 10a of the first embodiment includes a resin projection 40 serving as a positioning structure for positioning the cable (power feeder 24) of another electronic component (antenna unit 12b), as is shown in FIGS. 4 and 5.

The antenna unit 10a comprises a resin core member 42 formed as a rectangular block, and an antenna wire 44 (not shown in detail) wound around the core member 42. The antenna wire 44 is a printed wire incorporated in a rectangular, flexible printed circuit board (hereinafter, the FPC board) 46, and is wound around the core member 42 by winding the FPC board 46 around the core member 42. When the FPC board 46 is wound around the core member 42 as shown in FIG. 4, the opposite ends of the core member 42 slightly project from the FPC board 46.

A printed ground element G for grounding the antenna wire 44 is incorporated in the FPC board 46, and a power feeder 21 is connected to the power feeding point (not shown) of the antenna wire 44 of the FPC board 46. The end 46a of the FPC board 46 close to the ground element G is held between the liquid crystal panel 8 and the rear cover 2b of the display unit 2. At this time, the antenna unit 10a is attached to the rear cover 2b of the display unit 2 by a double-sided tape, with a reinforcing plate 48 interposed therebetween. The end 46b of the FPC board 46 close to the antenna wire 44 terminates near the lower end of the front side of the core member 42.

Namely, the FPC board 46 covers the front surface, upper surface and rear surfaces of the core member 42, and does not cover the lower surface of the core member 42 facing the upper end of the liquid crystal panel 8. The projection 40 is attached to the lower surface of the core member 42 that does not interfere with the antenna wire 44. Since the core member 42 is formed of a resin, it may be formed integral with the projection 40 as one body. The projection 40 is slightly shorter than the core member 42. Further, in the embodiment, the projection 40 continuously extends along the longitudinal axis of the core member 42. Alternatively, a plurality of projections may be provided with intervals along the longitudinal axis of the core member 42.

As can be understood from the cross section shown in FIG. 5, the projection 40 has a recess 40a hat is formed along the longitudinal axis of the projection 40 to define a constant distance between the power feeder 24 extending near the projection and the lower surface of the core member 42, namely, to define a constant distance between the antenna unit 10a and the power feeder 24. This means that when the power feeder 24 is Just received in the recess 40a, the constant distance can be automatically defined between the antenna unit 10a and the feeder 24 itself. Further, from another point of view, the recess 40a of the projection 40 defines a protection section 40b for protecting the power feeder 24.

When placing the power feeder 24 in the recess 40a, firstly, the antenna unit 10a is placed inside the rear cover 2b of the display housing 2, then the adjacent antenna unit 12b is placed inside the rear cover 2b, and lastly, the power feeder 24 is pushed from below into the recess 40a and received therein. At this time, several portions of the power feeder 24 may be temporarily fixed to the inner wall of the recess using a tape (not shown), to prevent the same from being displaced from the recess. Since thus, the power feeder 24 is received in the recess 40a, it can be prevented also from being nipped between the antenna unit 10a and the rear cover 2b.

As described above, in the first embodiment, mere additional attachment of the projection 40 including the recess 40a to the core member 42 enables a constant distance to be defined between the antenna 10a and the power feeder 24 of another electronic component 12b adjacent to the antenna unit 10a, thereby preventing variations in antenna characteristics, i.e., stabilizing the antenna characteristics.

FIG. 6 shows a modification of the above-described first embodiment. This modification comprises at least one claw 40c extending from the inner edge of the protection section 40b. The claw 40c prevents the power feeder 24 from being displaced from the recess 40a. When placing the power feeder 24 in the recess 40a defined by the claw 40c, the power feeder 24 is pushed over the claw 40c into the recess 40a, and is latched therein by the claw 40c.

In the modification, the possibility of displacement of the power feeder 24 from the recess 40a is weaker than in the first embodiment in which the power feeder 24 is received in the recess 40a with no claw. Therefore, the modification does not need any tape for temporarily fixing the power feeder 24, thereby reducing the material cost and simplifying the assemblage.

FIG. 7 is a sectional view illustrating an antenna unit 10a provided with a projection 50 that serves as a positioning structure according to a second embodiment of the invention. The antenna 10a of the second embodiment differs from the first embodiment only in that the projection 50 of the former has a different cross section from the projection 40 of the latter. Therefore, elements of the second embodiment similar to those of the first embodiment are denoted by corresponding reference numbers, and are not described in detail.

The projection 50 has a recess 52 of a U-shaped cross section opening toward the upper end of the liquid crystal panel 8. The recess 52 functions to define a constant distance between the power feeder 24 and the core member 42, as in the first embodiment. Accordingly, the projection 50 can provide the same advantage as the Projection 40 of the first embodiment. Moreover, the power feeder 24 can be more reliably positioned than in the first embodiment.

Namely, when the power feeder 24 Is received in the recess 52 of the projection 50, it is held between the opposite side walls 54 of the recess, and hence the thicknessways movement of the power feeder 24 with respect to the display housing 2 can also be prevented. Thus, the degree of freedom of movement of the cower feeder 24 can be further reduced than in the first embodiment employing the projection 40, thereby further stabilizing the characteristics of the antenna unit 10a.

FIG. 8 shows a modification of the above-described second embodiment. This modification is characterized in that the U-shaped recess 58 of a projection 56 laterally opens.

In the modification, when placing the power feeder 24 in the U-shaped recess 58, it can be pushed therein from the front of the projection 56. This facilitates routing of the power feeder 24, compared to the second embodiment in which the power feeder 24 is upwardly pushed into the recess 52 from the clearance between the upper end of the liquid crystal panel $ and the projection 50. In this case, if a claw (not shown) is provided on an edge of the recess 56, a tape for temporary fixing is not necessary. Thus, this modification provides the same advantage as that obtained by the second embodiment using the projection 50, and also facilitates attachment of the power feeder 24 and hence assemblage of the entire apparatus.

FIG. 9 is a sectional view illustrating an antenna unit 10a provided with a projection 60 that serves as a positioning structure according to a third embodiment of the invention. The antenna 10a of the third embodiment differs from the first embodiment only in that the projection 60 of the former has a recess 64 or receiving two cables 24 and 62. Therefore, elements of the third embodiment similar to those of the first embodiment are denoted by corresponding reference numbers, and are not described in detail.

The recess 64 of the project-on 60 is formed wider than the recess 40a of the projection 40 of the first embodiment, as is evident from FIG. 9, so that it can receive a cable 26 connected to another electronic component (not shown), as well as the power feeder 24 of the antenna unit 12b.

FIG. 10 shows a first modification of the third embodiment, in which two cables 24 and 62 are received in the recess of a projection 60', and the movement of one of the cables, i.e., the cable 62, is more reliably prohibited. FIG. 11 shows a second modification of the third embodiment, in which the movement of both cables 24 and 62 are reliably prohibited. In these cases, the cables 24 and 62 are positioned by minimizing the degree of movement of the cables in the width direction of the display housing 2, with the result that the characteristics of the antenna unit 10a are stabilized.

FIG. 12 is a sectional view illustrating an antenna unit 10a, which is provided with at least one rib 70 that serves as a positioning structure according to a fourth embodiment of the invention and cooperates with the projection 40 to position the power feeder 24. The projection 40 has the same structure as that of the first embodiment. Namely, the positioning structure of the fourth embodiment differs from that of the first embodiment in that the former includes the at least one rib 70 as well as the projection 40. In the fourth embodiment, elements similar to those of the first embodiment are denoted by corresponding reference numbers, and are not described in detail.

The rib 70 forwardly protrudes from the inner surface of the rear cover 2b of the display housing 2 between the protection section 40b of the projection 40 and the upper end of the liquid crystal panel 8. The rib 70 may be formed integral with the rear cover 2b as one body. Further, the rib 70 may be provided along the entire antenna unit 10. In the fourth embodiment, however, two ribs 70 are provided separate from each other along the longitudinal axis of the antenna unit 10a, as is shown in FIG. 13.

The ribs 70 are protruded to the protection portion 40b of the projection 40 through rectangular holes 72 formed in corresponding portions of the reinforcing plate 48 and FPC board 46. When positioning the power feeder 24 using the ribs 70, the antenna unit 12b is attached to the rear cover 2b, then the power feeder 24 is placed on the two ribs 70, and then the antenna unit 10a with the projection 40 is attached. As a result, the power feeder 24 is placed between the projection 40 and the ribs 70.

The fourth embodiment provides the same advantage as the first embodiment, and also facilitates routing of the power feeder 24. Namely, it is not necessary to push the power feeder 24 into the recess 40a or to temporarily fix the power feeder 24, thereby enhancing the efficiency of assemblage.

FIG. 14 is a sectional view illustrating an antenna unit 10a provided with at least one rib 80 that serves as a positioning structure according to a fifth embodiment of the invention. This positioning structure differs from those employed in the other embodiments, in that it has no projections attached to the core member 42. The other members used in the fifth embodiment are similar to those of the other embodiments and modifications, and are denoted by corresponding reference numbers. No detailed description will be given of these members.

The rib 80 is protruded from the inner surface of the rear cover 2b of the display housing 2, and formed integral with the rear cover 2b as one body. Through holes 82 for inserting the rib 80 therethrough are formed in corresponding portions of the reinforcing plate 48 and FPC board 46 of the antenna unit 10a. The rib 80 is interposed between the antenna unit 10a (core member 42) and the power feeder 24 to define a constant distance therebetween.

When positioning the power feeder 24 using the rib 80 as the positioning structure, the antenna unit 10a is attached to the rear cover 2b, then the antenna unit 12b is attached to the rear cover 2b, and then the power feeder 24 is placed below the rib 80. After that, several portions of the power feeder 24 are temporarily fixed to the rib 80, using a tape 84.

As described above, concerning the antenna unit 10a of the fifth embodiment, to reliably position the power feeder 24 and stabilize the characteristics of the antenna unit 10a, it is sufficient if the hole 82 is formed in the FPC board 46 of the antenna unit 10a.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may he made without departing from the spirit of the inventions. The accompanying claims and their equivalents are intended to cover such forms or modifications as would fall within the scope and spirit of the inventions.

What is claimed is:

1. An electronic device comprising:
a rectangular flat display housing;
a main unit coupled to a lower end of the display housing via hinges;
at least one electronic component provided inside an upper peripheral portion of the display housing;
an antenna unit provided inside the upper peripheral portion closer to a corner of the display housing than the at least one electronic component, the antenna unit being separate from the at least one component; and
a cable electrically coupling the at least one electronic component to the main unit, the cable extending through the hinges and along a peripheral portion of the display housing adjacent to the antenna unit;
wherein the antenna unit comprises a non-conductive positioning structure positioning the cable for the at least one electronic component such that the cable extends at a constant distance from the antenna unit.

2. The electronic device of claim 1, wherein:
the antenna unit includes a core member formed of an insulating material, and an antenna wire wound around the core member; and
the non-conductive positioning structure protrudes from the core member at a position at which the non-conductive positioning structure does not interfere with wireless signals transmitted or received through the antenna wire.

3. The electronic device of claim 2, wherein the non-conductive positioning structure includes a recess receiving the cable to define the constant distance between the core member and the cable.

4. The electronic device of claim 3, wherein the recess includes a claw preventing the cable from being displaced from the recess.

5. The electronic device of claim 3, wherein:
the at least one electronic component includes a plurality of electronic components; and
the recess receives a plurality of cables connecting the plurality of electronic components to the main unit.

6. The electronic device of claim 3, wherein the non-conductive positioning structure includes a rib projecting from the display housing and cooperating with the recess to limit movement of the cable.

7. The electronic device of claim 1, wherein the non-conductive positioning structure includes a rib projecting from the display housing between the antenna unit and the cable.

8. An electronic device comprising:
a rectangular flat display housing;
an electronic component provided inside an upper peripheral portion of the display housing;
an antenna unit provided inside the upper peripheral portion closer to a corner of the display housing than the at least one electronic component, the antenna unit being separate from the electronic component; and
a cable electrically coupled to the electronic component and physically separated from the antenna unit, the cable extending near the antenna unit along a peripheral portion of the display housing; and
wherein the antenna unit comprises a non-conductive positioning structure positioning the cable for the electronic component such that the cable extends at a constant distance from the antenna unit.

9. The electronic device of claim 1, wherein the non-conductive positioning structure includes a recess to receive the cable, the recess being formed so that the non-conductive positioning structure is situated between a front surface of the peripheral portion of the display housing and the cable.

10. The electronic device of claim 9, wherein the recess of the non-conductive positioning structure is formed so that the non-conductive positioning structure also is situated between (i) a reinforcement plate attached to the antenna unit and (ii) the cable.

11. The electronic device of claim 8, wherein the non-conductive positioning structure includes a recess to receive the cable, the recess being formed so that the non-conductive positioning structure is situated between a front surface of the peripheral portion of the display housing and the cable.

12. The electronic device of claim 11, wherein the recess of the non-conductive positioning structure is formed so that the non-conductive positioning structure also is situated between (i) a reinforcement plate attached to the antenna unit and (ii) the cable.

13. An electronic device comprising:
a main unit including an integrated circuit;
a display housing rotationally coupled to the main unit, the display housing including a plurality of peripheral portions surrounding a display panel, the plurality of peripheral portions comprise an upper peripheral portion and at least one side peripheral portion;
an electronic component situated inside the upper peripheral portion of the display housing;
a cable electrically coupling the electronic component to the integrated circuit; and
an antenna unit provided inside the upper peripheral portion without electrical connectivity with the cable, the antenna unit comprises a non-conductive positioning structure positioning the cable for the electronic component such that the cable extends at a constant distance from the antenna unit.

14. The electronic device of claim 13, wherein the non-conductive positioning structure of the antenna unit includes a recess to receive the cable, the recess being formed so that the non-conductive positioning structure is situated between (i) a front surface of the upper peripheral portion of the display housing and (ii) the cable.

15. The electronic device of claim 14, wherein the recess of the non-conductive positioning structure is formed so that the non-conductive positioning structure also is situated between (iii) a reinforcement plate attached to the antenna unit and (iv) the cable.

16. The electronic device of claim 13, wherein:
the antenna unit includes a core member formed of an insulating material, and an antenna wire wound around the core member; and
the non-conductive positioning structure protrudes from the core member at a position at which the non-conductive positioning structure does not interfere with wireless communications via the antenna wire.

17. The electronic device of claim 16, wherein the non-conductive positioning structure includes a recess receiving the cable to define the constant distance between the core member of the antenna unit and the cable.

18. The electronic device of claim 14, wherein the recess is adapted to prevent the cable from being displaced from the recess.

19. The electronic device of claim 18, wherein:
the at least one electronic component includes a plurality of electronic components; and
the recess receives a plurality of cables connecting the plurality of electronic components to the integrated circuit.

* * * * *